(12) United States Patent
Avidane et al.

(10) Patent No.: US 12,704,093 B2
(45) Date of Patent: Aug. 11, 2026

(54) PTMS THERMAL BUS VAPOR CYCLE ARCHITECTURE

(71) Applicant: RTX Corporation, Farmington, CT (US)

(72) Inventors: Orin G. Avidane, Lighthouse Point, FL (US); Javier A. Cue, Palm Beach Gardens, FL (US); Nathan A. Snape, Tolland, CT (US)

(73) Assignee: RTX Corporation, Farmington, CT (US)

( * ) Notice: Subject to any disclaimer, the term of this patent is extended or adjusted under 35 U.S.C. 154(b) by 266 days.

(21) Appl. No.: 18/420,957

(22) Filed: Jan. 24, 2024

(65) Prior Publication Data

US 2025/0237413 A1 Jul. 24, 2025

(51) Int. Cl.

| | |
|---|---|
| ***F02C 7/16*** | (2006.01) |
| ***F02C 7/14*** | (2006.01) |
| ***F02C 7/32*** | (2006.01) |
| ***F02C 7/36*** | (2006.01) |

(52) U.S. Cl.

CPC .................. *F02C 7/16* (2013.01); *F02C 7/14* (2013.01); *F02C 7/32* (2013.01); *F02C 7/36* (2013.01); *F05D 2210/14* (2013.01); *F05D 2260/213* (2013.01)

(58) Field of Classification Search

CPC .... F02C 7/16; F02C 7/12; F02C 7/224; F02C 7/14; F02C 7/32; F02C 7/36

See application file for complete search history.

(56) References Cited

U.S. PATENT DOCUMENTS

| | | | | |
|---|---|---|---|---|
| 11,391,211 | B2 * | 7/2022 | Smith | F02C 7/224 |
| 2006/0218926 | A1 | 10/2006 | Prociw et al. | |
| 2009/0260387 | A1 | 10/2009 | Defrancesco | |
| 2010/0236215 | A1 | 9/2010 | Venkataramani et al. | |
| 2010/0236217 | A1 | 9/2010 | Venkataramani et al. | |
| 2012/0000205 | A1 | 1/2012 | Coffinberry et al. | |
| 2012/0248242 | A1 * | 10/2012 | Gagne | F02C 6/08 244/58 |
| 2012/0297789 | A1 * | 11/2012 | Coffinberry | B64D 37/34 60/39.83 |
| 2015/0001339 | A1 * | 1/2015 | Gagne | B64D 13/06 244/58 |

(Continued)

OTHER PUBLICATIONS

Extended European Search Report for counterpart EP Application No. 25152633 dated Jun. 12, 2025.

*Primary Examiner* — Ted Kim

(74) *Attorney, Agent, or Firm* — Bachman & LaPointe, P.C.

(57) ABSTRACT

A power and thermal management system thermal bus vapor cycle architecture including a bypass duct formed between a gas turbine inner fan duct and a gas turbine outer fan duct; a condenser coil located within the bypass duct, the condenser coil being configured as an annulus disk shape heat exchanger; at least one evaporator coil fluidly coupled to the condenser coil and located within the bypass duct upstream of the condenser coil relative to a bypass air flow direction; a gearbox in operative communication with the gas turbine engine; and a variable speed compressor in operative communication with the gearbox, the variable speed compressor being fluidly coupled with the at least one evaporator coil and the condenser coil.

15 Claims, 4 Drawing Sheets

(56) References Cited

U.S. PATENT DOCUMENTS

2017/0159566 A1 6/2017 Sennoun et al.
2017/0314471 A1 11/2017 Sennoun
2018/0283287 A1* 10/2018 Mossi ....................... F02C 9/54
2020/0332716 A1* 10/2020 Ribarov .................. F02C 7/224
2021/0122478 A1 4/2021 Mackin et al.
2023/0323814 A1* 10/2023 Terwilliger ............... F02C 3/22
60/806

* cited by examiner

PTMS THERMAL BUS VAPOR CYCLE ARCHITECTURE

BACKGROUND

The present disclosure is directed to an improved power and thermal management system thermal bus vapor cycle architecture.

Gas turbine engines include components requiring lubrication by engine oil. Two such components that represent primary sources of heat in gas turbine engines are engine bearings, engine gearbox, and engine electrical generators such as integrated drive generator (IDG) or variable frequency generator (VFG) systems. Gas turbine engines require fuel-oil coolers and air-oil coolers to keep oil within specific temperature limits. Known air-oil coolers include compact heat exchangers, surface coolers, and compact bar and plate coolers. Such known air-oil coolers form a part of a fan case-mounted oil thermal management architecture in gas turbine engines including oil reservoir and air-oil cooler, along with associated ducting and mounting components.

Known fan case-mounted oil thermal management architectures may represent significant size, weight, fan drag, that is dP/P, and complexity costs impacting specific fuel consumption, performance, and maintenance efficiency.

SUMMARY

In accordance with the present disclosure, there is provided a power and thermal management system thermal bus vapor cycle architecture comprising a bypass duct formed between a gas turbine inner fan duct and a gas turbine outer fan duct; a condenser coil located within the bypass duct, the condenser coil being configured as an annulus disk shape heat exchanger; at least one evaporator coil fluidly coupled to the condenser coil and located within the bypass duct upstream of the condenser coil relative to a bypass air flow direction; a gearbox in operative communication with the gas turbine engine; and a variable speed compressor in operative communication with the gearbox, the variable speed compressor being fluidly coupled with the at least one evaporator coil and the condenser coil.

A further embodiment of any of the foregoing embodiments may additionally and/or alternatively include the at least one evaporator coil comprises staged evaporator coils configured as a series of two fluid or three fluid heat exchangers.

A further embodiment of any of the foregoing embodiments may additionally and/or alternatively include the staged evaporator coils comprise sequenced stages from a forward lowest thermal demand to a highest thermal demand being most aft relative to the bypass air flow direction responsive to standard day operating conditions.

A further embodiment of any of the foregoing embodiments may additionally and/or alternatively include the power and thermal management system thermal bus vapor cycle architecture further comprising a controller in operative communication with the variable speed compressor.

A further embodiment of any of the foregoing embodiments may additionally and/or alternatively include the power and thermal management system thermal bus vapor cycle architecture further comprising an expansion valve fluidly coupled between the condenser coil and the at least one evaporator coil.

A further embodiment of any of the foregoing embodiments may additionally and/or alternatively include the at least one evaporator coil comprises a two-fluid configuration with a static vapor-only sink and alternating passages of vapor and source.

A further embodiment of any of the foregoing embodiments may additionally and/or alternatively include the at least one evaporator coil comprises a three-fluid configuration arranged to operate utilizing bypass air, wherein the three-fluid configuration employs a combination of vapor and bypass air as cooling sinks.

In accordance with the present disclosure, there is provided a power and thermal management system thermal bus vapor cycle architecture comprising a gas turbine engine having a fan proximate a forward portion and a low pressure turbine proximate an aft portion; an inner fan duct spanning between the fan and the lower pressure turbine; a gas turbine outer fan duct spanning between the fan and the low pressure turbine; a bypass duct formed between the inner fan duct and the outer fan duct, the bypass duct extending from the fan to the low pressure turbine, wherein a bypass air is configured to flow within the bypass duct from the fan aft toward the low pressure turbine; a condenser coil located within the bypass duct, the condenser coil being configured as heat exchanger configured to contact the bypass air; at least one evaporator coil fluidly coupled to the condenser coil and located within the bypass duct upstream of the condenser coil relative to a bypass air flow direction, the at least one evaporator coil being configured as a heat exchanger configured to contact the bypass air; an expansion valve fluidly coupled between the condenser coil and the at least one evaporator coil; a gearbox in operative communication with the gas turbine engine; and a variable speed compressor in operative communication with the gearbox, the variable speed compressor being fluidly coupled with the at least one evaporator coil and the condenser coil.

A further embodiment of any of the foregoing embodiments may additionally and/or alternatively include the power and thermal management system thermal bus vapor cycle architecture further comprising a controller in operative communication with the variable speed compressor, wherein the variable speed compressor is configured to vary the rate of compression responsive to a controller input and a gas turbine engine operational status.

A further embodiment of any of the foregoing embodiments may additionally and/or alternatively include the at least one evaporator coil comprises staged evaporator coils configured as a series of two fluid heat exchangers or three fluid heat exchangers, wherein the staged evaporator coils comprise sequenced stages from a forward lowest thermal demand to a highest thermal demand being most aft relative to the bypass air flow direction responsive to standard day operating conditions.

A further embodiment of any of the foregoing embodiments may additionally and/or alternatively include the at least one evaporator coil comprises a two-fluid configuration with a static vapor-only sink and alternating passages of vapor and source.

A further embodiment of any of the foregoing embodiments may additionally and/or alternatively include the at least one evaporator coil comprises a three-fluid configuration arranged to operate utilizing bypass air, wherein the three-fluid configuration employs a combination of vapor and bypass air as cooling sinks.

A further embodiment of any of the foregoing embodiments may additionally and/or alternatively include the three-fluid configuration comprises dynamic dual sinks including a vapor and the bypass air, with the dynamic dual sinks including a sink-source pairing and bypass air configured for cooling, wherein valving and a manifold are configured to transport the vapor as a heat transfer fluid to and from stages for re-cooling and reuse.

In accordance with the present disclosure, there is provided a process for thermal management with a power and thermal management system thermal bus vapor cycle architecture comprising forming a bypass duct between an inner fan duct and an outer fan duct; locating a condenser coil within the bypass duct; configuring the condenser coil as a heat exchanger; fluidly coupling at least one evaporator coil to the condenser coil; locating the at least one evaporator coil within the bypass duct upstream of the condenser coil relative to a bypass air flow direction; configuring the at least one evaporator coil as a heat exchanger; fluidly coupling an expansion valve between the condenser coil and the at least one evaporator coil; coupling a gearbox in operative communication with the gas turbine engine; coupling a variable speed compressor in operative communication with the gearbox; and fluidly coupling the variable speed compressor with the at least one evaporator coil and the condenser coil.

A further embodiment of any of the foregoing embodiments may additionally and/or alternatively include the process further comprising coupling a controller in operative communication with the variable speed compressor; and configuring the variable speed compressor to vary the rate of compression responsive to a controller input and a gas turbine engine operational status.

A further embodiment of any of the foregoing embodiments may additionally and/or alternatively include the process further comprising configuring the at least one evaporator coil as staged evaporator coils; and configuring the staged evaporator coils as a series of two fluid or three fluid heat exchangers, wherein the staged evaporator coils comprise sequenced stages from a forward lowest thermal demand to a highest thermal demand being most aft relative to the bypass air flow direction responsive to standard day operating conditions.

A further embodiment of any of the foregoing embodiments may additionally and/or alternatively include the at least one evaporator coil comprises a two-fluid configuration with a static vapor-only sink and alternating passages of vapor and source.

A further embodiment of any of the foregoing embodiments may additionally and/or alternatively include the process further comprising configuring the at least one evaporator coil as a three-fluid configuration arranged to operate utilizing bypass air; and employing a combination of vapor and bypass air as cooling sinks.

A further embodiment of any of the foregoing embodiments may additionally and/or alternatively include the process further comprising configuring the three-fluid configuration as dynamic dual sinks including a vapor and the bypass air, with the dynamic dual sinks including a sink-source pairing and bypass air configured for cooling, wherein valving and a manifold are configured to transport the vapor as a heat transfer fluid to and from stages for re-cooling and reuse.

A further embodiment of any of the foregoing embodiments may additionally and/or alternatively include the process further comprising allowing at least one of fluids selected from the group consisting of fuel, engine oil, gearbox oil, hydraulic fluid, vehicle heat transfer fluid, generator oil, and the like to act as a sink; and allowing at least one of fluids selected from the group consisting of fuel, engine oil, gearbox oil, hydraulic fluid, vehicle heat transfer fluid, generator oil, and the like to be cooled by the vapor and bypass air when needed to maintain predetermined temperatures.

A further embodiment of any of the foregoing embodiments may additionally and/or alternatively include the process further comprising allowing at least one of fluids selected from the group consisting of fuel, engine oil, gearbox oil, hydraulic fluid, vehicle heat transfer fluid, generator oil, and the like to act as a sink; and allowing at least one of fluids selected from the group consisting of fuel, engine oil, gearbox oil, hydraulic fluid, vehicle heat transfer fluid, generator oil, and the like to be cooled by the vapor when needed to maintain predetermined temperatures.

A further embodiment of any of the foregoing embodiments may additionally and/or alternatively include the process further comprising configuring the at least one evaporator coil and/or the at least one condenser coil as an annulus disk shape heat exchanger.

Other details of the power and thermal management system thermal bus vapor cycle architecture are set forth in the following detailed description and the accompanying drawings wherein like reference numerals depict like elements.

DETAILED DESCRIPTION

Figures 1, 2:
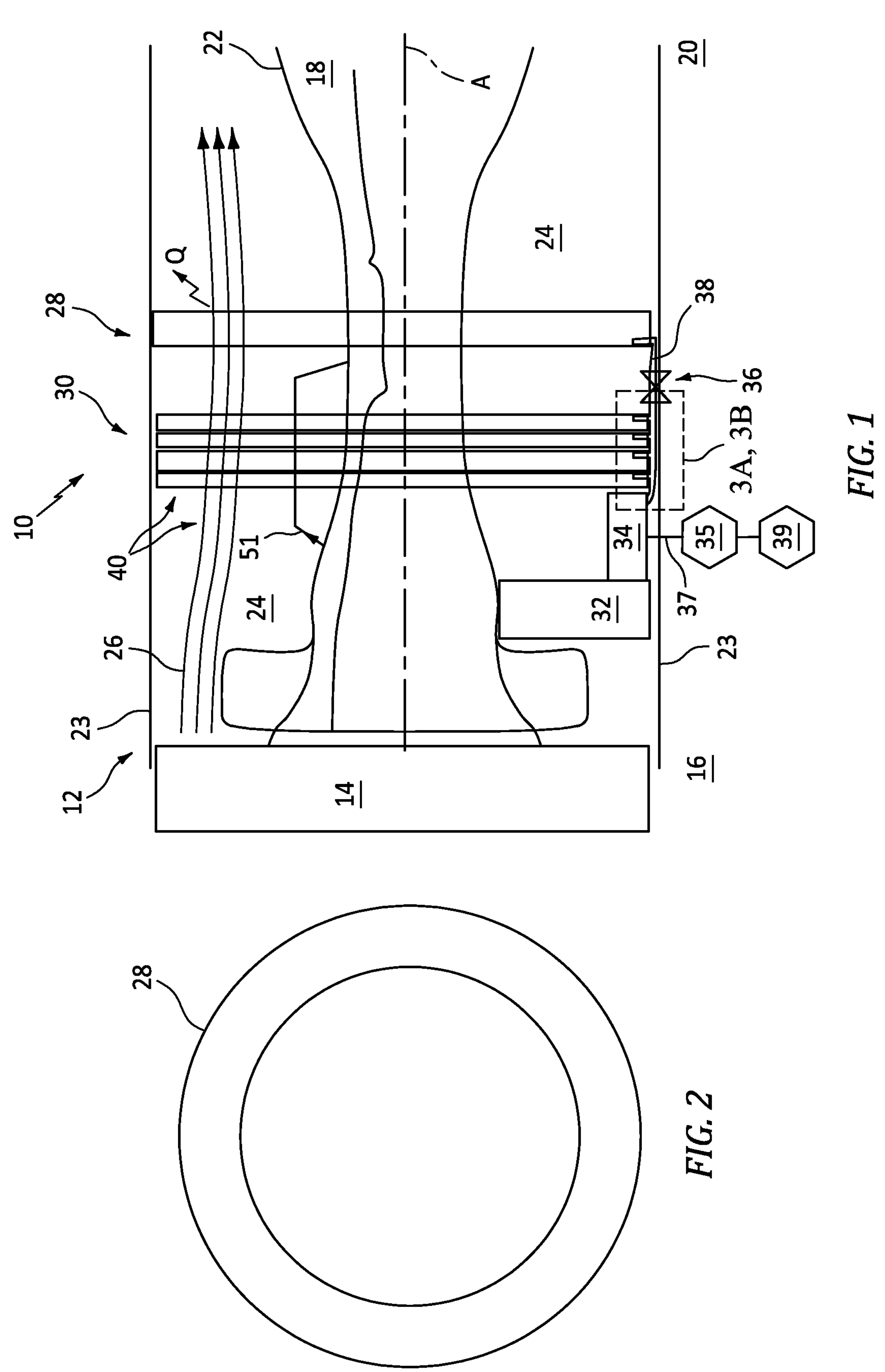
FIG. 1 is a cross-sectional side view schematic representation of an exemplary power and thermal management system thermal bus vapor cycle architecture in a gas turbine engine.
FIG. 2 is a schematic representation of a forward looking aft view of exemplary evaporator coils and condenser coil.

Referring now to FIG. 1 and FIG. 2, there is illustrated an exemplary power and thermal management system thermal bus vapor cycle architecture 10. The architecture 10 is configured with a gas turbine engine 12 having an axis A. The gas turbine engine 12 includes a fan section 14 at a forward portion 16 of the gas turbine engine 12. A low pressure turbine 18 is located proximate an aft portion 20 of the gas turbine engine 12. An inner fan duct 22, the gas turbine engine 12 extends from the forward portion 16 to the aft portion 20. The inner fan duct 22 and outer fan duct 23 define a bypass duct 24 that extends axially from the fan 14 aft beyond the low pressure turbine 18. The bypass duct 24 is radially external of the inner fan duct 22. Bypass air 26 discharged from the fan 14 flows through the bypass duct 24 toward the aft section 20 beyond the low pressure turbine 18.

Referring also to FIG. 2, a condenser coil 28 can be configured as an annulus disk shape heat exchanger. In exemplary embodiments, the condenser coil 28 can have shapes that accommodate equipment and conduit located in the bypass duct 24. The condenser coil 28 is located in the bypass duct 24. The condenser coil 28 can surround the inner fan duct 22. The condenser coil 28 is exposed to the bypass air 26, such that bypass air 26 flows through the condenser coil 28 and transfers thermal energy Q between the condenser coil 28 and the bypass air 26. The annulus disk shape of the condenser coil 28 avoids hot streak thermal phenomena downstream of the condenser coil 28 along the bypass duct 24 structures.

At least one evaporator coil 30 is configured as an annulus disk shape heat exchanger. The evaporator coil(s) 30 is also located within the bypass duct 24 upstream of the condenser coil 28. In an exemplary embodiment, the evaporator coils 30 are staged evaporator coils 30 configured as a series of two fluid or three fluid annulus disc shape heat exchangers. The staged evaporator coils 30 can be sequenced stages from a forward lowest thermal demand to highest thermal demand being most aft relative to the bypass air 26 flow direction responsive to standard day operating conditions.

A gearbox 32 is coupled to the inner fan duct 22 and mechanically driven by the rotating components of the gas turbine engine 12. The gearbox 32 can be located in the bypass duct 24. A variable speed compressor 34 is in operative communication with the gearbox 32 for motive operation. The variable speed compressor 34 is fluidly coupled with the evaporator coils 30 and the condenser coil 28. A controller/control system 35 can be in operative communication with the variable speed compressor 34. The variable speed compressor 34 is configured to vary the rate of compression responsive to the controller 35 input and gas turbine engine operational status.

The control system may include hardware, firmware, and/or software components that are configured to perform the functions disclosed herein, including the functions of the exemplary power and thermal management system thermal bus vapor cycle architecture 10. While not specifically shown, the control system 35 may include other computing devices (e.g., servers, mobile computing devices, etc.) and computer aided manufacturer (CAM) systems which may be in communication with each other and/or the control system 35 via a communication network 37 to perform one or more of the disclosed functions. The control system 35 may include at least one processor 39 (e.g., a controller, microprocessor, microcontroller, digital signal processor, etc.), memory, and an input/output (I/O) subsystem. The control system 35 may be embodied as any type of computing device e.g., a server, an enterprise computer system, a network of computers, a combination of computers and other electronic devices, or other electronic devices. Although not specifically shown, the I/O subsystem typically includes, for example, an I/O controller, a memory controller, and one or more I/O ports. The processor 39 and the I/O subsystem are communicatively coupled to the memory. The memory may be embodied as any type of computer memory device (e.g., volatile memory such as various forms of random access memory).

In an exemplary embodiment, an expansion valve 36 can be fluidly coupled between the condenser coil 28 and the evaporator coils 30. The expansion valve 36 can be configured to regulate the expansion of a working fluid 38 flowing from the condenser coil 28 to the evaporator coils 30.

Figure 3A:
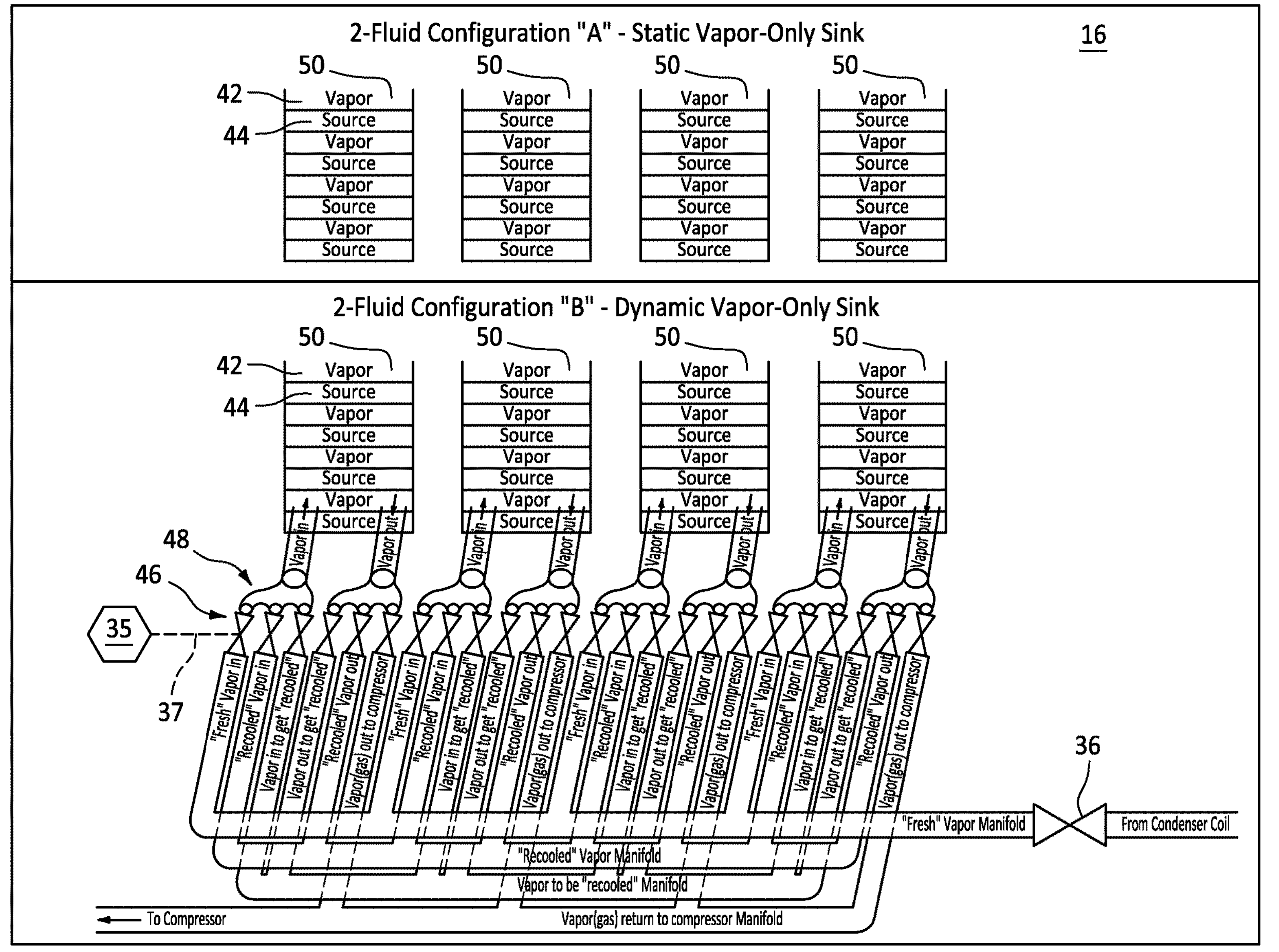
FIGS. 3A and 3B are exemplary charts depicting various working fluid configurations.
Figure 3B:
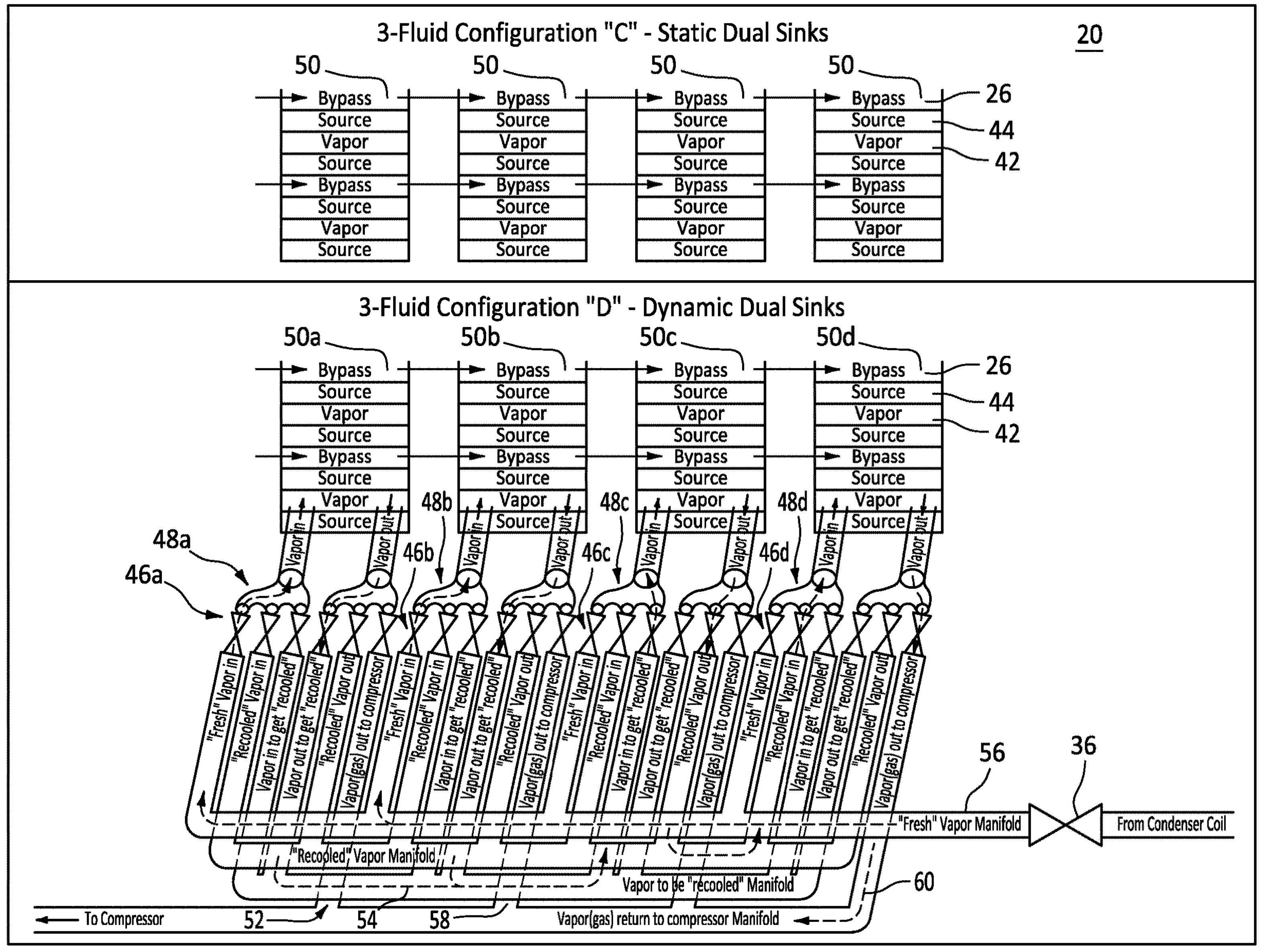

Referring also to FIG. 3, a variety of working fluid 38 configurations are shown. In exemplary embodiments, the evaporator coils 30 can be arranged to operate in a 2-fluid configuration without utilizing bypass air 26.

Configuration A is shown as a 2-fluid configuration with static vapor-only sink 40. Configuration A includes alternating passages of vapor 42 and source 44. The vapor 42 can be a refrigerant material. The source 44 can include a fuel, an engine oil, buffer air, a vehicle heat transfer fluid, other working fluids such as hydraulics, generator oil, and the like, engine cooling air, such as diffuser air and turbine cooling air (TCA), and the like as well as cooling recovery stages to optimize the sink-source pairing. In configuration A, vapor 42 can move from stage 50 to stage 50 in series or in parallel, or in a portioned combination thereof. The configuration A does not take advantage of sink-source pairing but may be advantageous for simplicity of design.

Configuration B is shown as a 2-fluid configuration with a dynamic-only sink. The configuration B takes advantage of sink-source pairing. Valving 46 and manifolds 48 can deploy vapor 42 as heat transfer fluid to and from any stage 50 for re-cooling and reuse.

In another exemplary embodiment the evaporator coils 30 can be arranged to operate in a 3-fluid configuration utilizing bypass air 26. The 3-fluid configuration employs a combination of vapor 42 and bypass air 26 as cooling sinks 40.

Configuration C is shown as a 3-fluid configuration with static dual sinks being the vapor 42 and the bypass air 26. In configuration C, vapor 42 can move from stage 50 to stage 50 in series or in parallel, or in a portioned combination thereof.

Configuration D is shown as a 3-fluid configuration with dynamic dual sinks 40 such as vapor 42 and bypass air 26. The configuration D takes advantage of sink-source pairing and fan bypass 26 cooling. In configuration D valving 46 and manifold 48 can move vapor 42 as the heat transfer fluid to and from any stage 50 for re-cooling and reuse. The controller 35 can activate/deactivate the valving 46 to direct the vapor 42 to the various stages 50.

The configurations B and D allow fuel to act as a sink when possible, and also allow the fuel to be cooled by the vapor 42 and bypass air 26 when needed to maintain predetermined temperatures.

The configurations C and D can be configured to use fan bypass air 26 cooling only when the source 44 is sufficiently cooled without vapor 42. Stages 50 can run independently as fan-only or fan-and-vapor cooling.

For configurations which utilize sink-source pairing, the vapor 42 fluid can act as a dual purpose heat transfer fluid. For example, the vapor 42 can be used for evaporative cooling in stage #1 for source 44 fluid being oil. At stage #2 the source can be fuel for re-cooling the vapor 42 fluid. Then moving to stage #3 buffer air can be the source 44 to transfer cooling from the fuel to the buffer air, then subsequently return the vapor 42 to the compressor 34. In an exemplary embodiment, one of the evaporator 30 stages can be dedicated to cooling bleed air 51. The bleed air 51 can then be fed back into the gas turbine engine 12 as turbine cooling air and/or a combination of turbine cooling air and buffer air.

Figure 4:
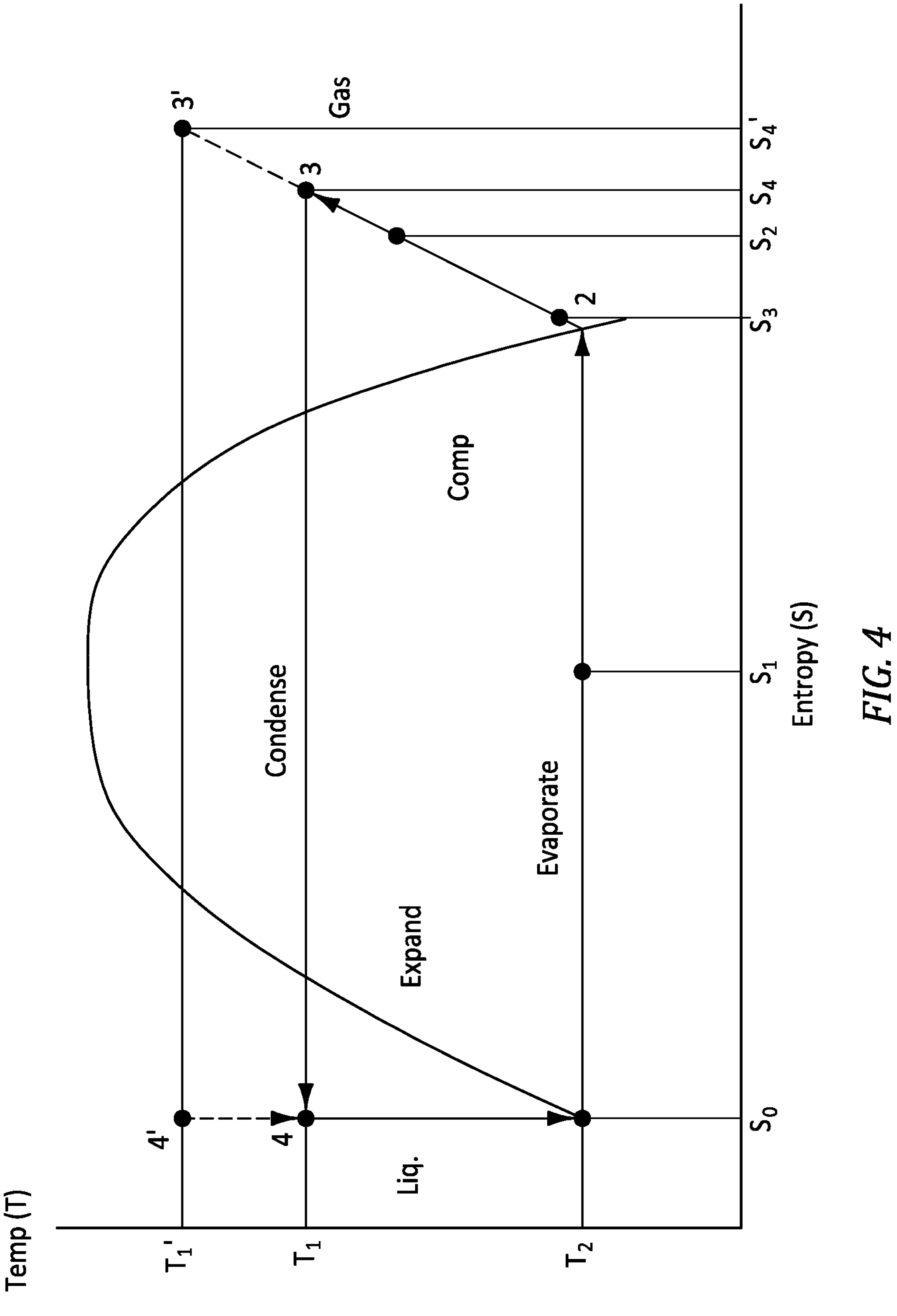
FIG. 4 is an exemplary temperature entropy diagram.

Referring also to FIG. 4, a temperature-entropy diagram is shown. The temperature (T) is shown in the y-axis and the entropy (S) is shown along the x-axis. The temperature-entropy diagram illustrates the cycle of the working fluid refrigerant 54 through various stages. The flow sequence of the example shown in FIG. 4 has been drawn within the configuration D schematic shown in FIG. 3 with dashed arrows 52.

Refrigerant liquid 54 may be used for cooling in stage 1 from point S0 to S1, cooling in stage 2 from point S1 to S2, (net transfer from stages 1 & 2 brings entropy from point S0 to S2) then vapor may be recooled in stage 3 by fuel from point S2 to S3, then used as cooling in stage 4 from point S3 to S4. In exemplary embodiments, an altered cycle can shift as seen in FIG. 4 as S4' and 3'.

As seen in FIG. 3, configuration D includes details following the flow path of the working fluid refrigerant 54 through the stages 50*a*, 50*b*, 50*c*, 50*d*. The working fluid refrigerant 54 exits the condenser 28 and flows through the expansion valve 36 into a fresh vapor manifold 56. The fresh vapor manifold 56 feeds the working fluid refrigerant 54 past the valving 46*a* and manifold 48*a* into the stage 50*a* evaporator coils 30 (shown as vapor in). The fresh vapor manifold 56 feeds the working fluid refrigerant 54 past the valving 46*b* and manifold 48*b* into the stage 50*b* evaporator coils 30 (shown as vapor in). The working fluid refrigerant 54 flows through the evaporator coils 30 and absorbs thermal energy from the source 44.

The working fluid refrigerant 54 flows out of the evaporator coils 30 (shown as vapor out) from the stage 50*a* into manifold 48*a* and passes through valving 46*a* into a vapor to be recooled manifold 58. The working fluid refrigerant 54 flows out of the evaporator coils 30 (shown as vapor out) from the stage 50*b* into manifold 48*b* and passes through valving 46*b* into a vapor to be recooled manifold 58.

The working fluid refrigerant 54 then flows from the manifold 58 to another stage 50*c* to be recooled (shown as vapor to get recooled). The working fluid refrigerant 54 flows past valving 46*c* and manifold 48*c* (shown as vapor in) into the evaporator coils 30 of another stage 50*c* to be recooled. The working fluid refrigerant 54 flows through the evaporator coils 30 and exchanges thermal energy from another source 44. The working fluid refrigerant 54 flows out of the evaporator coils 30 (shown as vapor out) through the manifold 48*c* and valving 46*c* into the recooled manifold 58 (shown as recooled vapor out).

The working fluid refrigerant 54 can pass through the manifold 58 to an additional stage 50*d* (shown as recooled vapor in) and flow past the valving 46*d* and manifold 48*d* into the next evaporator coils 30 (shown as vapor in).

The working fluid refrigerant 54 flows into a vapor return to compressor manifold 60 (shown as vapor (gas) out to compressor). The working fluid refrigerant 54 flows through the vapor return to compressor manifold 60 to the variable speed compressor 34 to be compressed.

A technical advantage of the disclosed architecture can include a net cooling capacity.

Another technical advantage of the disclosed architecture can include the ability to optimize the sink-source pairing in the evaporator.

Another technical advantage of the disclosed architecture can include reduced loses in efficiencies from heat transfer (gearbox/burn versus bleed and heat transfer through various heat exchangers).

Another technical advantage of the disclosed architecture can include cooling recovery/waste reduction.

Another technical advantage of the disclosed architecture can include weight reduction.

Another technical advantage of the disclosed architecture can include elimination and consolidation of heat exchangers.

Another technical advantage of the disclosed architecture can include reduction in heat signature cooling.

There has been provided a power and thermal management system thermal bus vapor cycle architecture. While the power and thermal management system thermal bus vapor cycle architecture has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A power and thermal management system thermal bus vapor cycle architecture comprising:

a gas turbine engine having a fan proximate a forward portion and a low pressure turbine proximate an aft portion;

an inner fan duct spanning between the fan and the lower pressure turbine;

a gas turbine outer fan duct spanning between the fan and the low pressure turbine;

a bypass duct formed between the inner fan duct and the outer fan duct, the bypass duct extending from the fan to the low pressure turbine, wherein a bypass air is configured to flow within the bypass duct from the fan aft toward the low pressure turbine;

a condenser coil located within the bypass duct, the condenser coil being configured as a heat exchanger configured to contact the bypass air;

at least one evaporator coil fluidly coupled to the condenser coil and located within the bypass duct upstream of the condenser coil relative to a bypass air flow direction, the at least one evaporator coil being configured as a heat exchanger configured to contact the bypass air;

an expansion valve fluidly coupled between the condenser coil and the at least one evaporator coil;

a gearbox in operative communication with the gas turbine engine; and a variable speed compressor in operative communication with the gearbox, the variable speed compressor being fluidly coupled with the at least one evaporator coil and the condenser coil.

2. The power and thermal management system thermal bus vapor cycle architecture according to claim 1, further comprising:

a controller in operative communication with the variable speed compressor, wherein the variable speed compressor is configured to vary the rate of compression responsive to a controller input and a gas turbine engine operational status.

3. The power and thermal management system thermal bus vapor cycle architecture according to claim 1, wherein the at least one evaporator coil comprises staged evaporator coils configured as a series of two fluid heat exchangers or three fluid heat exchangers, wherein the staged evaporator coils comprise sequenced stages from a forward lowest thermal demand to a highest thermal demand being most aft relative to the bypass air flow direction responsive to standard day operating conditions.

4. The power and thermal management system thermal bus vapor cycle architecture according to claim 1, wherein the at least one evaporator coil comprises a two-fluid configuration with a static vapor-only sink and alternating passages of vapor and source.

5. The power and thermal management system thermal bus vapor cycle architecture according to claim 1, wherein the at least one evaporator coil comprises a three-fluid configuration arranged to operate utilizing bypass air, wherein the three-fluid configuration employs a combination of vapor and bypass air as cooling sinks.

6. The power and thermal management system thermal bus vapor cycle architecture according to claim 5, wherein the three-fluid configuration comprises dynamic dual sinks including a vapor and the bypass air, with the dynamic dual sinks including a sink-source pairing and bypass air configured for cooling, wherein valving and a manifold are configured to transport the vapor as a heat transfer fluid to and from stages for re-cooling and reuse.

7. A process for thermal management with a power and thermal management system thermal bus vapor cycle architecture comprising:

forming a bypass duct between an inner fan duct and an outer fan duct in a gas turbine engine;

locating a condenser coil within the bypass duct;

configuring the condenser coil as a heat exchanger;

fluidly coupling at least one evaporator coil to the condenser coil;

locating the at least one evaporator coil within the bypass duct upstream of the condenser coil relative to a bypass air flow direction;

configuring the at least one evaporator coil as a heat exchanger;

fluidly coupling an expansion valve between the condenser coil and the at least one evaporator coil;

coupling a gearbox in operative communication with the gas turbine engine;

coupling a variable speed compressor in operative communication with the gearbox; and fluidly coupling the variable speed compressor with the at least one evaporator coil and the condenser coil.

8. The process of claim 7, further comprising:

coupling a controller in operative communication with the variable speed compressor; and configuring the variable speed compressor to vary the rate of compression responsive to a controller input and a gas turbine engine operational status.

9. The process of claim 7, further comprising:

configuring the at least one evaporator coil as staged evaporator coils; and configuring the staged evaporator coils as a series of two fluid or three fluid heat exchangers, wherein the staged evaporator coils comprise sequenced stages from a forward lowest thermal demand to a highest thermal demand being most aft relative to the bypass air flow direction responsive to standard day operating conditions.

10. The process of claim 7, wherein the at least one evaporator coil comprises a two-fluid configuration with a static vapor-only sink and alternating passages of vapor and source.

11. The process of claim 7, further comprising:

configuring the at least one evaporator coil as a three-fluid configuration arranged to operate utilizing bypass air; and employing a combination of vapor and bypass air as cooling sinks.

12. The process of claim 11, further comprising:

configuring the three-fluid configuration as dynamic dual sinks including a vapor and the bypass air, with the dynamic dual sinks including a sink-source pairing and bypass air configured for cooling, wherein valving and a manifold are configured to transport the vapor as a heat transfer fluid to and from stages for re-cooling and reuse.

13. The process of claim 12, further comprising:

allowing at least one of fluids selected from the group consisting of fuel, engine oil, gearbox oil, hydraulic fluid, vehicle heat transfer fluid, and generator oil to act as a sink; and allowing at least one of fluids selected from the group consisting of fuel, engine oil, gearbox oil, hydraulic fluid, vehicle heat transfer fluid, and generator oil to be cooled by the vapor and bypass air when needed to maintain predetermined temperatures.

14. The process of claim 10, further comprising:

allowing at least one of fluids selected from the group consisting of fuel, engine oil, gearbox oil, hydraulic fluid, vehicle heat transfer fluid, and generator oil to act as a sink; and allowing at least one of fluids selected from the group consisting of fuel, engine oil, gearbox oil, hydraulic fluid, vehicle heat transfer fluid, and generator oil to be cooled by the vapor when needed to maintain predetermined temperatures.

15. The process of claim 7 further comprising:

configuring the at least one evaporator coil and/or the at least one condenser coil as an annulus disk shape heat exchanger.

* * * * *